Figure 1:
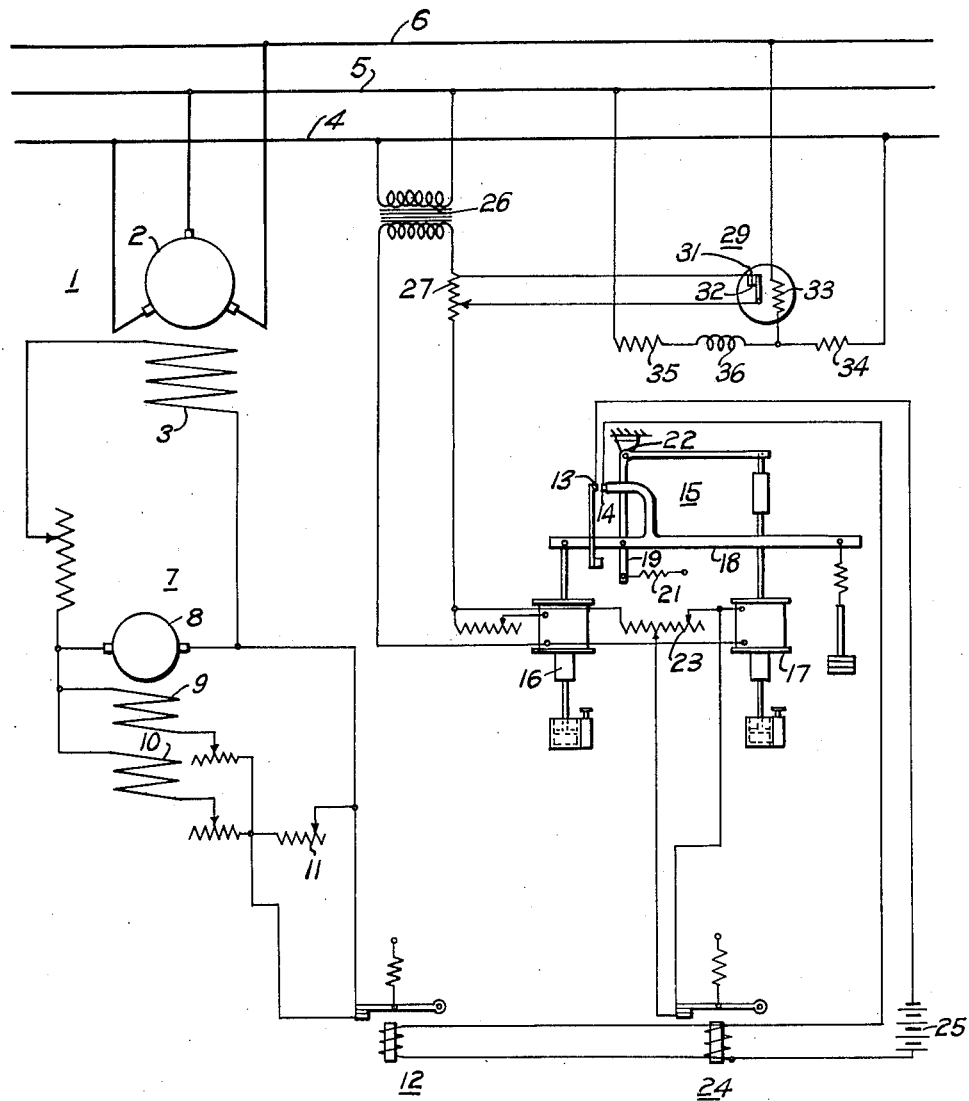

Patented Nov. 19, 1929

1,736,471

UNITED STATES PATENT OFFICE

CHARLES F. WAGNER, OF PITTSBURGH, AND ROBERT D. EVANS AND SAMUEL B. GRISCOM, OF WILKINSBURG, PENNSYLVANIA, ASSIGNORS TO WESTINGHOUSE ELECTRIC AND MANUFACTURING COMPANY, A CORPORATION OF PENNSYLVANIA

REGULATOR SYSTEM

Application filed June 10, 1925. Serial No. 36,135.

Our invention relates to regulator systems and has for one of its objects the variation of the regulator action under abnormal power circuit conditions to improve the stability of power transmission systems.

When the power demand on a generator increases or decreases suddenly by reason of load changes, switching, short-circuits, or other transitory causes, there exists a momentary unbalance between the power input and the power output of the generator. This unbalanced condition is created because electrical changes in the system occur much faster than mechanical changes. The governor mechanism controlling the prime mover for the generator is unable to change the governor setting as rapidly as the generator output is changed.

The excess or deficiency of power demand over the power output of the generator is supplied by, or absorbed by, the rotating masses of the generator and the prime mover, thereby slowing down or speeding up the rotor, as the case may be. As the generator rotor assumes a new phase position with reference to the rest of the system, the power demand on the generator will, in general, change in such direction as to diminish the unbalance between generator input and generator output, thereby tending to bring the system into equilibrium.

When such phase angle is reached that the power input and power output are in balance, the rotor will have a velocity either in excess of or less than that corresponding to the rest of the system and therefore, must travel beyond the point of equilibrium. This phenomena is referred to as "generator overswing". The effect of such overswing is to lessen the degree of stability of a power transmission system because the upper limit of capacity to transmit power must be high enough to supply the amount of energy necessary to absorb the momentum of the generating equipment during its maximum swings.

Large power transmission systems usually consist of an extensive network of generator stations and a number of load-consuming points connected together by the network. For convenience, the synchronous machinery of the receiver end of the transmission line may be considered as an approximately equivalent motor with fixed impedance and internal voltage. This impedance is then considered as a part of the total transmission line impedance. The equivalent motor may be taken as having infinite inertia, that is, it is assumed to rotate at a constant synchronous speed regardless of any disturbance that may occur on the transmission line.

One electrical characteristic of this simplified power transmission system is that the power output of the generator is a sine function of the phase displacement between the generator and the motor internal voltages. During the normal operation of the system at a given load, a particular phase angle, corresponding to equal power output and input, establishes a state of stable equilibrium. Should the phase angle increase for some reason with the same power input to the generator, the power output of the generator would become greater than the input, thus causing the generator to slow down. Similarly, if the phase angle between the generator and the motor is decreased, the generator input becomes greater than the generator output, thus causing the generator to speed up.

When a short-circuit occurs from line to ground on present day systems, the power output of the generator will be changed because of the changed constants of the connecting circuit. For the same phase angle between the motor and generator internal voltages, the power output of the generator will thus either increase or decrease. The power input to the generator, is however, determined by the prime mover. The difference between the generator input and the generator output must, therefore, be supplied from, or absorbed by, the kinetic energy of rotation of the generators, thus causing them to slow down or to speed up.

In slowing down, for example, the phase angle between the generator and motor internal voltages is decreased and the power output is also decreased. When the power output is again equal to the power input, the angular velocity of the generator is less than that of the motor and its angle will decrease still further, thereby reaching a point where the power output is less than the power input and thus causing the generator to again increase its speed. It will be seen, therefore, that the phase angle between the generator and motor internal voltages will vary alternately, the period of the overswing depending upon the inertia of the generator and the constants of the electrical circuit.

In the problem of improving the stability of power transmission systems there is another factor to consider, namely, the decrease in voltage caused by the demagnetization of the synchronous machines, which may be of considerable importance especially during short-circuits. In the usual transmission line, the regulator attempts to maintain a fixed terminal generator voltage, or a somewhat compensated voltage upon the line. If a short-circuit occurs, the exciter voltage will be increased, but the change in phase relations and the normal functioning of the regulator will reduce the exciter voltage. The change in angular positions of the synchronous machines will cause a demand for reactive power far in excess of the capacity of the generator to furnish the same at constant voltage, and the voltage will rapidly decrease.

With the proposed system, however, the generator internal voltage will be permitted to build up to some value in excess of normal during the early portion of the cycle of mechanical movement and will be maintained at that value, so that, as the phase angle between the synchronous machines increases, the increased voltage will maintain stable conditions upon the system.

In the present system, a resistor is connected in the energizing circuit of the voltage regulator and a relay is provided that normally short-circuits this resistor. This relay is so connected to the power circuit by means of a suitable network as to be responsive to negative, or to zero, phase-sequence currents or to any appropriate quantity that would indicate disturbance on the transmisison line. The energization of the relay separates the relay contact members and inserts the resistor in circuit with the regulator control magnet, thus causing it to regulate for an increased voltage.

Figure 2:
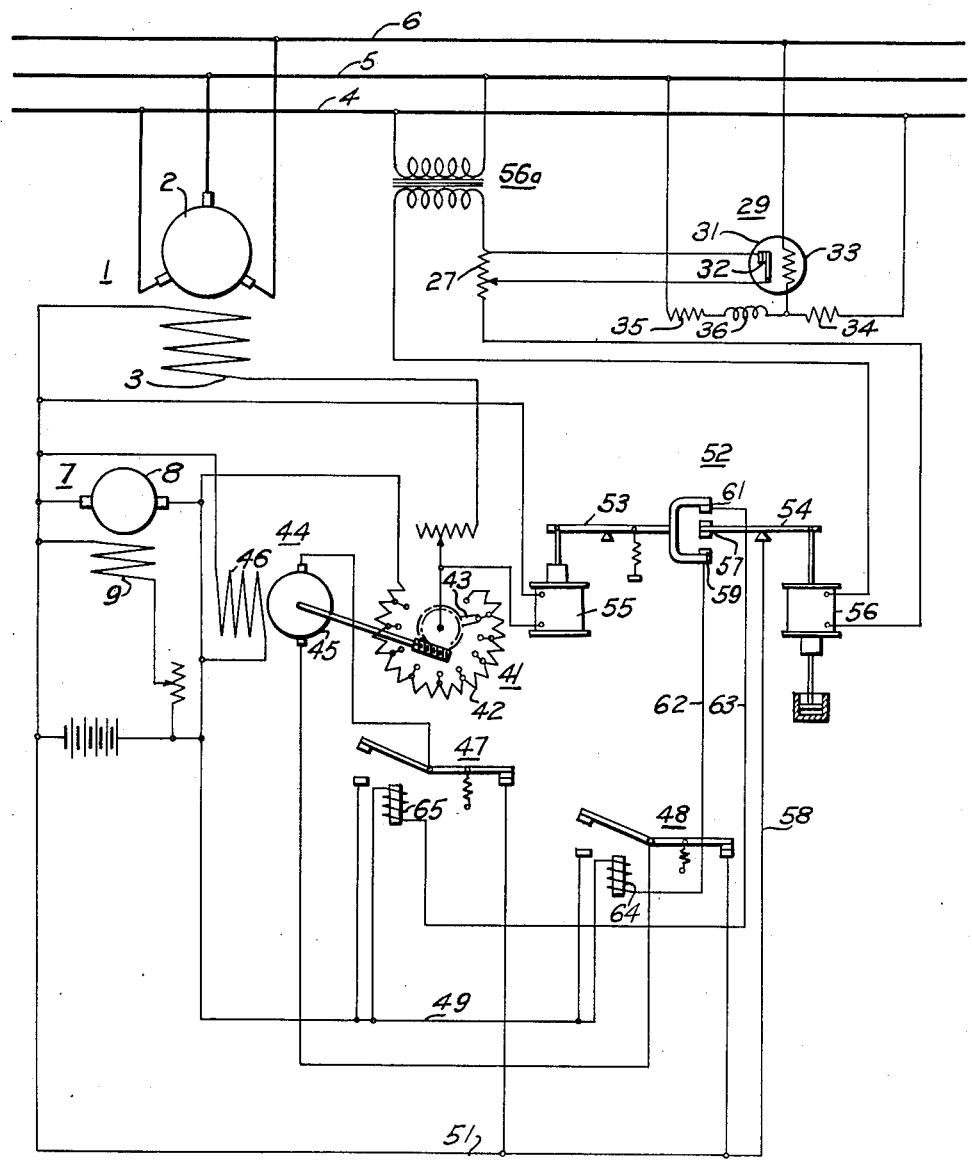

Our invention will be better understood by reference to the accompanying drawing wherein, Fig. 1 illustrates a schematic view of our invention as employed in a vibratory regulator system, and Fig. 2 illustrates a diagrammatic view of the invention as used with a rheostatic type regulator.

Referring to the drawing, a dynamo-electric machine 1, having an armature 2 and a field winding 3, is connected to a power circuit or transmission line 4—5—6. The generator field winding 3 is connected to be energized from an exciter generator 7, which is provided with an armature winding 8 and with a plurality of field windings 9 and 10 that are connected in parallel circuit relation to each other, and in series circuit relation with a resistor 11. A relay 12 is provided to intermittently close a circuit in shunt relation to the resistor 11 in accordance with the engagement of contact members 13 and 14 of a voltage regulator 15.

The regulator 15 further comprises a control magnet 16 and an anti-hunting magnet 17. The magnet 16 is connected to actuate a lever 18 that carries the movable contact member 14, and is pivotally mounted upon the lower end of a bell-crank lever 19. The bell-crank lever 19 is actuated by the anti-hunting magnet 17 against the pull of a spring member 21. In circuit with the electromagnet 17 a resistor 23 is provided, and a relay 24 is so connected as to close a circuit in shunt relation to the resistor 23 upon engagement of the regulator contact members 13 and 14, current being supplied from any suitable source, such as the battery 25. The electromagnets 16 and 17 are connected to be energized from a transformer 26 in accordance with the voltage of the power circuit 4—5—6. A resistor 27 is provided in circuit with the regulator control magnet 16 and a relay 29 is provided with an operating winding 33 and with engaged contact members 31 and 32 for shunting resistor 27. The relay 29 is connected to the three conductors 4—5—6 of the power circuit through a phase sequence network comprising a resistor 34 in one leg or phase of the network and a resistor 35 and a reactor 36 in another leg of the network, so that the relay 29 is energized only upon unbalanced power circuit conditions.

In the form of the invention illustrated in Fig. 2, a rheostat 41 is provided in circuit with the generator field winding 3 and comprises a resistor 42 and a movable contact arm 43 that is controlled by a pilot motor 44. The pilot motor 44 comprises an armature winding 45 and a field winding 46. The armature winding 45 is connected to a pair of reversing switches 47 and 48 of a familiar form, which are adapted to connect the motor armature across direct current supply conductors 49 and 51 in accordance with the operation of a regulator 52.

The regulator 52 comprises a pair of pivoted levers 53 and 54 that are actuated by electromagnets 55 and 56, respectively. The magnet 55 is energized in accordance with the voltage impressed upon the generator field winding 3 and the magnet 56 is energized through a transformer 56a, in accordance with the voltage of the power circuit 4—5—6. A contact member 57 is provided upon one end of the lever 54 and is adapted to selectively engage contact members 59 and 61, which are carried by the lever 53. Upon engagement of the contact member 57 with respective contact members 59 or 61, a circuit is closed either through conductors 62 and operating winding 64 of reversing switch 48, or through conductor 63 and operating winding 65 of reversing switch 47, thereby causing the one or the other of the reversing switches to be actuated to a motor-operating position, and thus causing the motor 44 to rotate in the one or in the other direction to correspondingly control the rheostat 41.

Upon the occurrence of a transient power-circuit condition that may be caused by switching, or by a short-circuit upon the transmission line, unbalanced conditions will develop in the power circuit, thereby causing current to flow through the winding 33 of the relay 29, either between the conductors 6 and 5 or the conductors 6 and 4 of the power circuit, thus actuating the relay to insert the resistor 27 in the circuit of the regulator control magnet 16 or control magnet 56 to thereby reduce the voltage impressed thereupon. The resultant operation of the regulator to maintain constant voltage upon the regulator control magnet will cause the internal voltage of the generator to be increased. This increase in generator internal voltage increases the capacity of the system to provide the reactive current necessary to suitably improve or maintain the stability of the transmission line during the transient condition. If this condition disappears from the power circuit, the relay contact members 31 and 32 again become engaged, thus causing the regulator to maintain normal voltage upon the power circuit.

Many modifications may be made in the apparatus and circuits disclosed, within the spirit of our invention, and we do not wish to be limited other than by the scope of the appended claims.

We claim as our invention:

1. In a regulator system, a power transmission circuit, a dynamo-electric machine connected thereto and provided with a field winding, a regulator for governing the excitation of said field winding in accordance with power-circuit conditions, and means responsive to an unbalanced condition of said power circuit for modifying the action of said regulator.

2. In a regulator system, a power circuit, a generator connected to said power circuit and provided with a field winding, a regulator for governing the excitation of said field winding, and means responsive to unbalanced power-circuit conditions for so changing the setting of the regulator as to increase the generator voltage to an abnormally high value to thereby increase the stability of the power circuit.

3. In a regulator system, a power circuit, a generator connected to said power circuit, a voltage regulator for controlling the generator to normally maintain a substantially constant voltage upon said power circuit, and means responsive to an unbalanced condition of said power circuit for causing the regulator to increase the generator voltage.

4. In a regulator system, a power circuit, a generator connected to said power circuit, a voltage regulator for controlling the generator to normally maintain a substantially constant voltage upon said power circuit, and means responsive to an unbalanced condition of said power circuit for causing the regulator to vary the generated voltage.

5. In a regulator system, a power circuit, a generator connected to said power circuit, a regulator for controlling the generator to normally maintain a substantially constant voltage upon said power circuit, and means operative under unstable power-circuit conditions for varying the setting of said regulator to create a stabilizing action in said system.

6. In a regulator system, a power circuit, a generator connected to said power circuit, a regulator for controlling the generator to normally maintain a substantially constant voltage upon said power circuit, a resistor, and means operative under certain power-circuit conditions for introducing said resistor in circuit with said regulator.

7. In a regulator system, a power circuit, a generator connected to said power circuit, a regulator for controlling the generator to normally maintain a substantially constant voltage upon said power circuit, means for introducing a stabilizing factor into said circuit comprising a resistor connected in circuit with said regulator, a relay normally short-circuiting said resistor, and means responsive to unbalanced power-circuit conditions for operating said relay to remove said short-circuit.

8. In a regulator system, a power circuit, a generator connected to said power circuit provided with a field winding, a regulator for controlling the excitation of said field winding to normally maintain a substantially constant voltage upon said power circuit, and means connected to said circuit and responsive to unbalanced power-circuit conditions for increasing the internal voltage of said generator to thereby effect stabilization of the power circuit.

9. In a regulator system, a power circuit, a generator connected to said power circuit provided with a field winding, a regulator for controlling the excitation of said field winding to normally maintain a substantially constant voltage upon said power circuit, and means for stabilizing said circuit comprising means responsive to transient power-circuit conditions for varying the internal voltage of said generator.

10. In a regulator system, a power circuit, a generator connected to said power circuit provided with a field winding, a regulator for controlling the excitation of said field winding to normally maintain a substantially constant voltage upon said power circuit, and means actuated in accordance with a phase sequence component of an electrical quantity of said power circuit for stabilizing said circuit.

11. In a regulator system, a power circuit, a generator connected to said power circuit provided with a field winding, a regulator for controlling the excitation of said field winding to normally maintain a predetermined voltage upon said power circuit, and means actuated in accordance with a phase sequence component of an electrical quantity of said power circuit for increasing the internal voltage of said generator.

12. In a regulator system, a power circuit, a generator connected to said power circuit provided with a field winding, a regulator comprising a control magnet for controlling the excitation of said field winding to normally maintain a predetermined voltage upon said power circuit, a resistor, and means actuated in accordance with a phase sequence component of an electrical quantity of said power circuit for introducing said resistor in circuit with said regulator control magnet.

In testimony whereof, we have hereunto subscribed our names this 29th day of May, 1925.

CHAS. F. WAGNER.
ROBERT D. EVANS.
SAMUEL B. GRISCOM.